United States Patent Office 3,732,335
Patented May 8, 1973

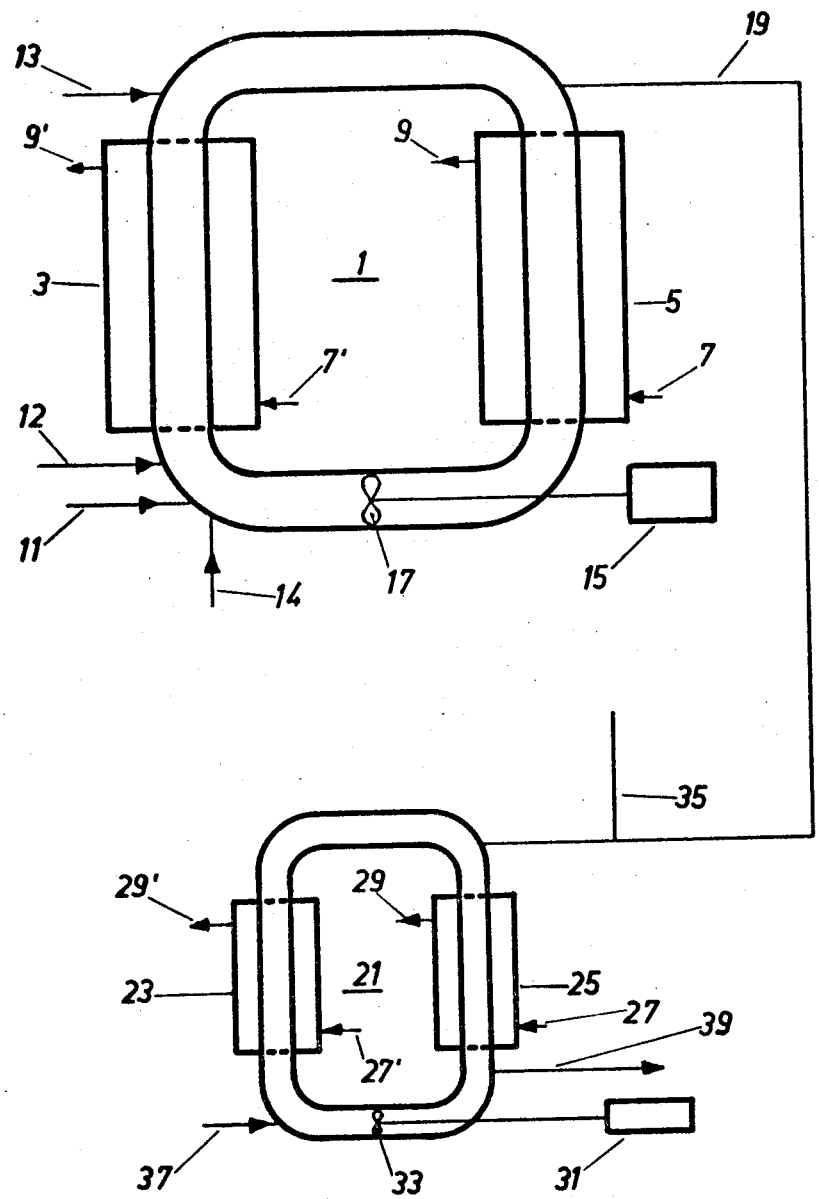

3,732,335
PROCESS FOR THE PREPARATION OF BLOCK POLYMERS
Jean Pierre Hermans, Strombeek-Bever, and Emile Leblon and Marcel Le Jeune, Brussels, Belgium, assignors to Solvay & Cie, Brussels, Belgium
Filed May 26, 1971, Ser. No. 146,933
Claims priority, application Luxembourg, May 28, 1970, 61,007/70
Int. Cl. C08f 1/42, 15/04, 19/04
U.S. Cl. 260—878 B                    18 Claims

ABSTRACT OF THE DISCLOSURE

Polypropylene modified by a random copolymer of propylene and a second α-olefin is prepared by a two-stage process. In the first stage, propylene is polymerized in the presence of violet $TiCl_3$ and dialkylaluminum monochloride until polypropylene in an amount of about 80 to 99% by weight of the total quantity of polymer to be prepared has been formed. A second α-olefin and a second activator constituted by trialkylaluminum is then added to the system and in a second stage, the polymerization is continued, propylene being polymerized with the second α-olefin to form a random copolymer in an amount of 1 to 20% by weight of the total quantity of polymer to be prepared.

BACKGROUND OF THE INVENTION

The present invention relates to a process for the preparation of polypropylene modified by a copolymer of propylene and another α-olefin.

Isotactic polypropylene is known to have excellent mechanical characteristics at room temperature and above; however, at temperatures below 5° C., its impact resistance is rather poor. A block or heteroblock copolymer constituted by segments of a random ethylene/propylene copolymer and by segments of isotactic polypropylene which contains relatively little ethylene has much better mechanical properties at low temperature than those of isotactic polypropylene. On the other hand, at room temperature or above, the physical and mechanical characteristics of such a copolymer are modified only slightly with respect to those of isotactic polypropylene.

The preparation of block or heteroblock copolymers of at least one α-olefin by alternating polymerization is well known. This process can be carried out by modifying the composition and nature of the monomer(s) contacted with the polymerization catalyst as has been disclosed by British Pat. No. 838,996 of Dec. 27, 1955, issued to Goodrich Gulf Chemicals, French Pat. No. 1,018,971 of May 5, 1950, and Belgian Pat. No. 560,366 of August 28, 1957 issued to Bataafsche Petroleum.

The known technique for preparing modified polypropylene generally involves preparing a product which is comprised mainly of isotatic polypropylene and segments of an ethylene/propylene copolymer having random distribution, as disclosed in French Pat. No. 1,220,947 of Jan. 8, 1959, issued to Phillips Petroleum Company and French Pat. No. 1,220,573 of Apr. 16, 1959, issued to Montecatini. Similar products may also be obtained from butene-1 and another higher α-olefin. "Ziegler" type catalysts are generally used for these processes.

It is known that propylene polymers which are modified by random propylene/second α-olefin copolymers may be prepared in two different ways, depending on the order chosen for the introduction of the monomers:

homopolymer, then the random propylene/second α-olefin copolymer; or
random propylene/second α-olefin copolymer, then homopolymer.

In French Pat. No. 1,294,608 of July 10, 1961, issued to Hoechst (this patent and each of the foregoing mentioned patents are incorporated by reference), the preparation of a polyolefin with an improved impact resistance is described in which:

(1) A copolymer is prepared by polymerizing a mixture of 75 to 30% by volume of ethylene and 25 to 70% by volume of propylene or butene-1 in the presence of 0.5 to 5 millimoles of $TiCl_3$ per liter of dispersant and 0.5 to 10 millimoles of triethylaluminum per liter of dispersant to obtain up to 20% by weight of the total mixture of polymers, and (2) After addition of 5 to 10 supplemental millimoles of $TiCl_3$ per liter of dispersant and 10 to 30 millimoles of diethylaluminum monochloride per liter of dispersant, a homopolymer is prepared by polymerizing olefins having from 2 to 10 carbon atoms, this homopolymer representing 98 to 80% by weight of the total mixture of polymers.

The triethylaluminum activator promotes the formation of an amorphous copolymer, whereas diethylaluminum monochloride promotes the formation of a highly crystalline compound.

The foregoing process wherein a random copolymer is produced first and then an olefin is homopolymerized to produce a homopolymer chain has numerous disadvantages.

When a random propylene/second α-olefin copolymer is prepared first, the second α-olefin must be eliminated before effecting the homopolymerization. In order to eliminate the α-olefin involved in the copolymerization, either the second α-olefin must be expanded or the reaction must be extended until the entire quantity of the second α-olefin is consumed. Moreover, the presence of residual quantities of triethylaluminum in the second step of such a process influences homopolymerization, favoring the formation of a poorly crystalline homopolymer.

The formation of an amorphous copolymer in an inert reaction medium, according to the process of the above-mentioned French Pat. No. 1,294,608, also involves numerous technological difficulties due to the dissolution of the resultant copolymer in the reaction medium.

SUMMARY OF THE INVENTION

We have discovered a polymerization process whereby the disadvantages of previous processes as discussed above are avoided.

According to the invention, a propylene polymer modified by combination with a random copolymer of propylene and a second α-olefin is prepared in the presence of a Ziegler type catalyst in a two-stage process. In the first stage of the process of the invention, propylene is polymerized in the presence of violet $TiCl_3$ and dialkylaluminum monochloride until polypropylene in an amount of about 80 to 99% by weight of the total quantity of polymer to be prepared is formed. Thereafter, a second activator composed of trialkylaluminum and a second α-olefin is added to the system which contains the propylene polymer, violet $TiCl_3$ and dialkylaluminum monochloride and, in a second stage of the process, the polymerization is continued, propylene being polymerized with the second α-olefin to form a random copolymer in an amount of 1 to 20% by weight of the total quantity of polymer to be formed.

BRIEF DESCRIPTION OF THE DRAWING

The figure is a schematic representation of apparatus comprised of two closed circuit, loop-type reactors in communication with each other which may be used to carry out the two-stage process of the present invention in a continuous manner.

DESCRIPTION OF THE INVENTION

It has been found that in the process of the present invention, when the molar ratio of trialkylaluminum/dialkylaluminum monochloride is between 0.03 and 1, and even more preferably between 0.1 and 0.8, the catalytic activity is substantially enhanced with respect to the formation of the elastomeric block copolymer obtained by copolymerizing propylene with the second α-olefin. At ratios below about 0.03, there is no notable effect on the activity of the catalyst and at a ratio above about 1, the activity does not continue to increase. Thus, the use of larger proportions of trialkylaluminum does not provide additional advantages.

The increased activity of the catalytic system is particularly advantageous because it enables a broad range of block copolymers to be prepared by a continuous process.

In general, in the preparation of modified polypropylene with good impact resistance at low temperature by a two-stage continuous process, using two continuous reactors mounted in series, particularly closed circuit reactors, one reactor being used for each stage of the process, it is difficult to influence the composition of the final product due to the fact that there are few parameters which may be varied in such a system. That is, when preparing block-polymers in a continuous manner using two connected reactors, the composition of the product is invariable for a given catalyst if the working conditions, i.e. temperature and pressure in each step of the reaction are fixed with respect to a specific volume of the reactors.

In accordance with the present invention, block copolymers can be obtained continuously at the normal polymerization temperatures of about 40 to 60° C. using a second reactor having a reasonable volume, i.e. not excessively large, simply by adding trialkylaluminum to the polymerization system which is comprised of the homopolymer of propylene, violet TiCl$_3$ and trialkylaluminum monochloride, whereby the copolymerization of propylene with the second α-olefin is carried out at such a rate as to avoid the use of a second reactor of excessive size or to use higher polymerization temperatures than that usually required.

Thus, a particular advantage of the present invention is that the proportion of block copolymer in the final product may be readily varied and even high proportions thereof may be obtained without use of excessively large reactors and without substantial variation of other parameters of the process.

Another advantage of the present invention is the notable decrease of the stereospecificity of the catalytic system observed in both continuous and batch processes, due to the addition of the trialkylaluminum compound to the dialkylaluminum chloride. This has a favorable influence on the impact resistance of the resultant product.

In the batch process, the system composed of the homopolymer of propylene, violet TiCl$_3$ and dialkylaluminum monochloride may be isolated by separating it from the reaction medium in which it has been formed. This may be carried out for example by expanding the propylene when the polymerization reaction has been carried out in a medium of liquid propylene. This system, which is a "living polymer," i.e. a polymer which is capable of continuing to polymerize when it is in the presence of at least one α-olefin, may be kept under a blanket of an inert gas such as nitrogen and may be used subsequently after the addition of trialkylaluminum in order to carry on further polymerization in the presence of propylene and another α-olefin.

The dialkylaluminum monochloride and trialkylaluminum activators used are generally compounds in which the alkyl groups contain from 1 to 8 carbon atoms and more preferably 2 carbon atoms. Actually, the number of carbon atoms in the alkyl groups of these compounds is not critical and dialkylaluminum monochloride and trialkylaluminum having more than 8 carbon atoms may be used, although such compounds are generally not as readily available as the lower alkyl compounds and in some cases may have somewhat lower activity. However, isoprenylaluminum, as described in U.S. Pat. No. 3,180,837, of Mar. 30, 1960, is among the trialkylaluminums which are desirably used in the present process.

The violet TiCl$_3$ catalyst is preferably a supported catalyst of the type described in French Pat. No. 1,550,186, of Aug. 31, 1967 and copending U.S. patent application Ser. No. 756,330 of Delbouille et al., filed on Aug. 27, 1968, now U.S. 3,594,330 and in French patent application No. 69,43826, of Dec. 17, 1969. In the latter process, titanium tetrachloride is reduced with an organometallic compound in liquid form in the presence of a support, the support having been impregnated with one of the reactants prior to the reduction and then introduced into the other reactant. Other stereospecific catalysts based on violet TiCl$_3$ are suitable for the present process, particularly catalysts based on 3TiCl$_3$.AlCl$_3$.

The particular amount of TiCl$_3$ is not critical and depends principally on the desired production, i.e. weight of product per hour. Hence, the preferred value can be readily calculated once the activity of the catalyst is known. However, in general, the ratio of TiCl$_3$ to liquid propylene may vary from about 0.001 to 2.5 and more preferably from 0.01 to 0.25 mg. at. Ti per liter of liquid in the reactor, to obtain an acceptable rate of production. It is not necessary to add TiCl$_3$ in the second stage of the present process, in view of the fact that the "living polymer," i.e. a polymer containing enough active TiCl$_3$ to allow the reaction to continue is used.

The ratio of activator to TiCl$_3$ in the first stage of the process is generally that which is usual in the art, i.e. a ratio of about 2:4 and preferably 3. However, in the event that the process is carried out batchwise and particularly where the "living polymer" is to be stored, in some cases the ratio may be considerably higher, up to about 10 or 20 in order to avoid reaction between the "living polymer" and any contaminants such as water or air. However, such high ratios are not usually required, particularly where the "living polymer" is to be used directly, such as in a continuous process.

The homopolymerization reaction may be carried out in a liquid reaction medium of propylene or an inert hydrocarbon, such as hexane, heptane, isooctane, benzene, toluene, etc. The subsequent copolymerization reaction may be carried out in suspension in a liquid mixture of the monomers involved in the reaction or in the gaseous phase. Preferably, the homopolymer block of propylene is formed at temperatures of about 40 to 70° C., depending on the crystallinity desired for the block in question. At the lowest polymerization temperatures, the highest crystallinities are obtained and hence, the highest rigidity moduli of the final product. The temperature of formation of the random propylene/second α-olefin copolymer is preferably between about 20 and 60° C., the highest temperature providing the highest catalytic activity. The pressure used is in the range of 20 to 45 kg./cm.$^2$ and depends of course on the polymerization temperature.

The second α-olefin used in the polymerization reaction preferably contains 2 to 12 carbon atoms. Among these may be mentioned ethylene, butene-1, 4-methylpentene, hexene-1, vinylbenzene and octene-1.

The proportion of propylene in the random copolymer formed in the second stage of the present process may vary from 1 to 99 mole percent depending on the desired properties of the block copolymer. Preferably the random copolymer block contains from 20 to 80 mole percent of propylene and the best elastomeric properties are obtained when the proportion of propylene in the random copolymer is about 40 to 60 mole percent.

Optionally, additional propylene may be introduced into the polymerization system when the second α-olefin and trialkylaluminum activator are introduced prior to the second stage of polymerization. Unless the excess propylene has been specifically removed from the reaction system, for example, when it is desired to isolate the "living polymer," the polymerization system ordinarily contains propylene along with the homopolymer of propylene, violet $TiCl_3$ and dialkylaluminum monochloride after the first stage of the polymerization has been completed. Additional propylene may be added as needed, depending on the medium used for the reaction and the desired proportion of propylene in the random copolymer.

The following examples further illustrate the best mode currently contemplated for carrying out the present process, except for Example 1 which has been included for purposes of comparison. However, the examples must not be construed as limiting the invention in any manner.

Examples 1 to 18

A 5-l. polymerization autoclave which has been dried is pressurized with propylene and degassed under atmospheric pressure three times. $AlCl(C_2H_5)_2$ in an amount of 702 mg., as a 200 g./l. solution in hexane, are introduced under a current of gaseous propylene at atmospheric pressure. After the current of gaseous propylene has been interrupted, hydogen is added corresponding to an absolute partial pressure of 1 kg./cm.$^2$, then 3 l. of liquid propylene are added.

The contents of the autoclave is heated to 50° C., and then the catalyst, which has been first introduced into the introduction device, is projected in the autoclave by means of the pressure of pure and dry nitrogen.

Approximately 30 mg. of $TiCl_3$ per liter of propylene are introduced, the catalyst being of the violet type

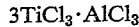

$$3TiCl_3 \cdot AlCl_3$$

supported on cenosphere type alumina, prepared by impregnating the support with liquid and then adding the thus impregnated support to titanium tetrachloride, as disclosed in French patent application No. 69,43826. The particular quantity of $TiCl_3$ in each example is given in Table 1. After 5 hours, the propylene is completely vaporized and the autoclave containing the "living polymer" is pressurized twice with 10 kg./cm.$^2$ of nitrogen then degassed at atmospheric pressure.

In order to recover the "living polymer" a stainless steel tube, connected at its external part with a three-necked flask, which has been dried and freed from oxygen and which is connected with a paraffin oil valve, is introduced through a valve capable of effecting complete opening, at the bottom of the autoclave which is flushed with a current of pure and dry nitrogen.

By increasing the nitrogen pressure (0.1 to 0.3 kg./cm.$^2$), the "living polymer" is carried from the autoclave to the flask. From time to time, the agitator is set in motion by hand to collect the product at the bottom of the autoclave.

The flask containing the recovered "living polymer" is weighed and may be stored sheltered from light.

The preparation of the ethylene-propylene block copolymer is carried out as follows:

A 5-l. autoclave, which has first been dried, is pressurized with propylene and degassed three times. A liquid mixture of ethylene and propylene, the composition of which has been chosen so as to obtain a molar ratio of propylene to the total amount of propylene and ethylene in the liquid phase equal to 0.9 is introduced into the thus prepared autoclave. The effective pressure of 20.4 kg./cm.$^2$ at 40° C. is increased to 21.4 kg./cm.$^2$ by introducing hydrogen.

The operational pressures are kept constant by continuously introducing ethylene.

A stainless steel chamber, which has been first dried and flushed with a current of pure and dry nitrogen is connected to the valve which effects complete opening of the bottom of the autoclave. Under a current of pure and dry nitrogen, a known weight of "living polypropylene," stored in the three-necked flask, is decanted into the chamber. The quantity of living polymer is chosen so as to introduce about 30 mg. of $TiCl_3$ per liter of propylene.

The chamber is closed and when the equilibrium pressure and temperature in the autoclave are reached, the valve with complete opening is opened and the "living polypropylene" is projected into the mixture of monomers.

After 5 minutes, the valve is closed and the pressure in the autoclave is kept constant by continuously introducing ethylene. The polymerization is carried out at 40° C., the $C_3H_6/(C_2H_4+C_3H_6)$ ratio being 0.9.

After a certain time, the copolymerization is stopped by addition of methanol and the mixture of monomers is completely vaporized. The recovered product is ventilated for one night in the hood, weighed and examined.

The polymerization conditions and the results of the evaluation of the properties of the polymers obtained are given in Table 1.

The activities are expressed in g. of product (homopolymer or block copolymer) per hour and per g. of $TiCl_3$.

G is the apparent rigidity modulus under torsion at 60° of arch at 100° C.

The ethylene content of the block copolymers is expressed in g./kg.

For each type of activator, a high increase of activity is observed when the $AlR_3/AlR_2Cl$ ratio is between 0.03 and 1, when compared to run No. 1.

This variation of activity is a function of the type of activator used.

Example 19

Continuous production of a block copolymer.—The equipment comprises two closed circuit, loop-type reactors and is schematically represented in the annexed figure, with reference to which this example will be described.

The first reactor 1 having a volume of 312 dm.$^3$ is fitted with two double jackets 3 and 5 provided with inlet pipes 7 and 7' and outlet pipes 9 and 9' for a liquid cooling agent, thus enabling the regulation of the temperature of the reactor.

Through pipe 11, liquid propylene (density at 25° C. and 1 atm.=0.507 kg./dm.$^3$) is introduced at a rate of 31.2 dm.$^3$/h., through pipe 12, $AlClEt_2$ is introduced at a rate of 7.48 cm.$^3$/h. (7.2 g./h.), through pipe 13, violet $\gamma TiCl_3$, supported on alumina and prepared as in Examples 1–18, (activity 0.6 kg. of polypropylene/h.g. of $TiCl_3$) is introduced at a rate of 0.925 g. of $TiCl_3$/h. This corresponds to a molar $AlClEt_2/TiCl_3$ ratio=10.

Hydrogen is introduced through pipe 14 at a rate of 120 mg. of hydrogen per kg. of propylene introduced.

In the reactor which has been completely filled with a liquid phase, circulation is secured by an axial pump 17 driven by motor 15.

The temperature in the first reactor is 60° C. and the density of the suspension is 0.2 kg./cm.$^3$. A production of 5.87 kg. of polypropylene per hour is obtained, the average time of stay in the reactor being 10.6 h.

The suspension leaves the reactor 1 through pipe 19 and enters reactor 21 having a capacity of 25 dm.$^3$.

The loop reactor 21 is also provided with two double jackets 23 and 25 with pipes 27, 27' and 29, 29' which provide for control of the temperature of the mixture which can be circulated by means of helix 33 driven by motor 31. This reactor is also completely filled with a liquid.

A quarter of the quantity of propylene introduced in the first loop (i.e. 7.8 dm.$^3$/h. is introduced through pipe 35, the liquid propylene being mixed with ethylene in order to realize a $C_3H_6/(C_3H_6+C_2H_4)$ molar ratio of 0.875 at the entrance of the loop. Polypropylene in an amount of 5.87 kg. is introduced as a suspension in the second loop reactor. The amount of liquid propylene mixed with ethylene to be added to the second reactor can be varied as desired. Since the density of the suspension leaving the first reactor is known or can be readily determined, and knowning the flow of the suspension leaving the first reactor, the amount of propylene and ethylene to be added to the second reactor to obtain the desired proportions of block copolymer is readily determined.

Triethylaluminum is introduced through pipe 37 at a rate of 10.1 ml./h. (7.4 m.moles/h.).

The temperature in the second reactor is 40° C. and the yield of copolymer per hour in the second reactor is 1.28 kg./h., i.e. a total of 7.15 kg./h. of product is obtained, which is recovered through pipe 39.

The product obtained has very high, low-temperature impact resistance. It has an apparent rigidity modulus G under torsion for 60° of arch and at 100° C. of 507 kg./cm.$^2$, a brittle point of −24° C. and a MFI of 2.5 g./min. at 230° C./2.16 kg./cm.$^2$.

The ethylene constant of the final product is 0.119 kg./kg. and the random copolymer content of the product is 0.178 kg./kg.

EXAMPLE 20

A second propylene-hexene copolymer block is prepared by using the "living polymer" described in Example 1. Into a 1.5 liter autoclave, which has first been dried, pressurized with propylene and degassed three times, is introduced a liquid mixture of propylene and hexene, the composition of which has been chosen so as to obtain a molar ratio of propylene to the total amount of propylene and hexene in the liquid phase equal to 0.25. At 60° C., the effective pressure of 4.8 kg./cm.$^2$ is increased to 5.8 kg./cm.$^2$ by introducing hydrogen. Activator is introduced in order to realize a ratio $$\frac{AlEt_3}{AlEt_3Cl}=1$$

A stainless steel chamber, which has been first dried and flushed with a current of pure and dry nitrogen is connected to the valve capable of effecting complete opening of the autoclave. Under a current of pure and dry nitrogen, a known weight of "living polypropylene," stored in a flask, is decanted into the chamber. The quantity of living polymer is chosen so as to introduce about 272 mg. of TiCl$_3$ per liter of hexene. The chamber is closed and when the equilibrium pressure and temperature in the autoclave are reached, the valve with complete opening is opened and the "living propylene" is projected in the mixture of monomers.

After 5 minutes, the valve is closed and the pressure in the autoclave is kept constant by continuously introducing propylene.

The polymerization is carried out at 60° C. After 46 minutes, the copolymerization is stopped by addition of methanol and the mixture of monomers is completely vaporized. The recovered product is ventilated for one night in the hood, weighed and examined.

The polymerization conditions and the results of evaluation of the properties of the polymers obtained are the following: G, the apparent rigidity modulus under torsion at 60° C. of arch at 100° C.=452 kg./cm.$^2$.

The fragility temperature was 0.5° C. for a fluidity index (MFI) of 23.

What we claim as new and desire to secure by Letters Patent is:

1. A two-stage process for preparing a propylene polymer modified by combination with a random copolymer of propylene and a second α-olefin in the presence of Ziegler type catalyst which comprises polymerizing propylene in the presence of violet TiCl$_3$ and dialkylaluminum monochloride in a first stage of polymerization until polypropylene in an amount of about 80 to 99% by weight of the total quantity of polymer to be prepared has been formed, then adding a second α-olefin and trialkylaluminum as a second activator to the reaction mixture containing polypropylene, violet TiCl₃ and dialkylaluminum monochloride, and in a second stage, continuing the polymerization by polymerizing propylene with said second α-olefin to form a random copolymer in an amount of 1 to 20% by weight of the total polymer formed.

2. A process according to claim 1 wherein the molar ratio of trialkylaluminum to dialkylaluminum chloride is between about 0.03 to 1.

3. A process according to claim 1 wherein the molar ratio of trialkylaluminum to dialkylaluminum chloride is between 0.1 and 0.8.

4. A process according to claim 1 wherein the second α-olefin is ethylene, butene-1, 4-methylpentene, hexene-1, vinylbezene or octene-1.

5. A process according to claim 1 wherein additional propylene is added to the reaction mixture together with said second α-olefin.

6. A process according to claim 1 wherein the dialkylaluminum monochloride and trialkylaluminum activators each contain 1 to 8 carbon atoms in the alkyl groups thereof.

7. A process according to claim 6 wherein the dialkylaluminum monochloride and trialkylaluminum activators each contain 2 carbon atoms in the alkyl groups thereof.

8. A process according to claim 1 wherein the homopolymerization reaction of propylene is carried out in a liquid reaction medium.

9. A process according to claim 8 wherein the homopolymerization reaction of propylene is carried out in a liquid reaction medium constituted by liquid propylene.

10. A process according to claim 8 wherein the homopolymerization reaction of propylene is carried out in a reaction medium constituted by an inert hydrocarbon.

11. A process according to claim 1 wherein the co-copolymerization reaction of propylene with the second α-olefin, in the presence of polypropylene formed during the first stage is carried out in the gaseous phase.

12. A process according to claim 1 wherein the violet TiCl₃ used is a supported catalyst.

13. A process according to claim 12 wherein the violet TiCl₃ used is supported on a cenosphere type αAl₂O₃.

14. A process according to claim 1 wherein the two stages of the process are carried out continuously in closed-circuit, loop type reactors.

15. A process according to claim 1 wherein propylene is polymerized in said first stage of polymerization at a temperature between about 40° to 70° C. and said polymerization in said second stage is carried out at a temperature between about 20° to 60° C.

16. A process according to claim 1 wherein in said second stage, the copolymerization of propylene with said second α-olefin is carried out in a reaction medium constituted by a liquid mixture of the monomers undergoing polymerization.

17. A process according to claim 1 wherein said random copolymer formed during said second stage contains 20 to 80 mole percent of propylene.

18. A process according to claim 1 wherein said random copolymer formed during said second stage of polymerization contains about 40 to 60 mole percent of propylene.

References Cited

UNITED STATES PATENTS 3,475,517   10/1969   Renaudo _____ 260—878 B

FOREIGN PATENTS

| 986,189 | 3/1965 | Great Britain | 260—878 |
| 1,550,186 | 12/1968 | France | 260—94.9 D1 |
| 12,429 | 6/1969 | Japan | 260—878 |

JAMES A. SEIDLECK, Primary Examiner

A. HOLLER, Assistant Examiner

U.S. Cl. X.R.

260—88.2 R, 93.7